(12) United States Patent
Albertyn

(10) Patent No.: US 12,104,396 B2
(45) Date of Patent: Oct. 1, 2024

(54) UTILITY POLE GIN TOOL

(71) Applicant: Western Utility Solutions, Inc., Ladera Ranch, CA (US)

(72) Inventor: Gregory Ian Albertyn, San Juan Capistrano, CA (US)

(73) Assignee: Western Utility Solutions, Inc., Ladera Ranch, CA (US)

( * ) Notice: Subject to any disclaimer, the term of this patent is extended or adjusted under 35 U.S.C. 154(b) by 564 days.

(21) Appl. No.: 17/304,773

(22) Filed: Jun. 25, 2021

(65) Prior Publication Data

US 2021/0404207 A1   Dec. 30, 2021

Related U.S. Application Data

(60) Provisional application No. 63/044,145, filed on Jun. 25, 2020.

(51) Int. Cl.
| | | |
|---|---|---|
| *B66C 23/06* | (2006.01) | |
| *E04H 12/24* | (2006.01) | |
| *E04H 12/34* | (2006.01) | |
| *H02G 1/02* | (2006.01) | |

(52) U.S. Cl.
CPC ............. *E04H 12/34* (2013.01); *E04H 12/24* (2013.01); *H02G 1/02* (2013.01)

(58) Field of Classification Search
CPC .................................. H02G 1/02; E04H 12/24
See application file for complete search history.

(56) References Cited

U.S. PATENT DOCUMENTS

| | | | | | |
|---|---|---|---|---|---|
| 3,605,359 | A | * | 9/1971 | Bader et al. ............ | E04H 12/08 52/146 |
| 4,068,427 | A | * | 1/1978 | Camardo ................ | E04G 21/26 52/749.1 |
| 4,684,031 | A | * | 8/1987 | Bergman ................ | H02G 1/02 212/245 |
| 6,003,632 | A | * | 12/1999 | Miller ...................... | E06C 1/34 182/187 |
| 6,185,303 | B1 | * | 2/2001 | Losey ..................... | A47B 96/06 379/453 |
| 6,655,097 | B1 | * | 12/2003 | Poolaw .................... | E04G 21/26 52/127.2 |
| 7,520,398 | B1 | * | 4/2009 | Ledman .................. | H02G 1/04 254/134.3 PA |
| D725,292 | S | * | 3/2015 | Wheelington .............. | D25/62 |

(Continued)

OTHER PUBLICATIONS

Hastings, "The Tools You Trust"; [Online Catalog]. Available: https://www.htgp.com/ib-catalog/811/ issued Mar. 2021, p.p. 811-812 [Accessed: Aug. 20, 2021].

(Continued)

*Primary Examiner* — Basil S Katcheves
(74) *Attorney, Agent, or Firm* — Knobbe, Martens, Olson & Bear, LLP

(57) ABSTRACT

A pole gin including a first portion having a first strap attachment configured to secure the pole gin to a utility pole at a first location and a second portion having a second strap attachment configured to secure the pole gin to the utility pole at a second location spaced from the first location. The first portion and the second portion can be adjustable relative to one another to vary a distance between the first location and the second location.

14 Claims, 9 Drawing Sheets

(56) References Cited

U.S. PATENT DOCUMENTS

| | | | | |
|---|---|---|---|---|
| 9,027,709 | B2* | 5/2015 | Wheelington | A01M 31/02 |
| | | | | 182/129 |
| 9,204,628 | B2* | 12/2015 | Priest | A01M 31/02 |
| 9,739,070 | B2* | 8/2017 | Bushore | E04C 3/30 |
| 11,365,556 | B1* | 6/2022 | Anderson | E04H 12/2238 |
| 2002/0130232 | A1* | 9/2002 | Herron | E04H 12/24 |
| | | | | 248/219.3 |
| 2009/0321186 | A1* | 12/2009 | Louchart | A01M 31/02 |
| | | | | 182/188 |
| 2010/0300808 | A1* | 12/2010 | Hale | A01M 31/02 |
| | | | | 182/187 |
| 2011/0308887 | A1* | 12/2011 | Johnson | A01M 31/02 |
| | | | | 182/187 |
| 2013/0075194 | A1* | 3/2013 | Hagberg | E04G 5/067 |
| | | | | 182/113 |
| 2014/0131137 | A1* | 5/2014 | Bassett | A01M 31/02 |
| | | | | 182/116 |
| 2014/0311828 | A1* | 10/2014 | Bassett | E06C 7/00 |
| | | | | 182/124 |
| 2014/0313406 | A1* | 10/2014 | Becker | H04N 5/907 |
| | | | | 348/374 |
| 2018/0310546 | A1* | 11/2018 | Pope | A01M 31/02 |
| 2020/0389006 | A1* | 12/2020 | Smith | H02G 7/056 |

OTHER PUBLICATIONS

Hubbell Power Systems, Chace Utility, "Standard Base Chain Gin"; [Online Catalog]. Available: https://www.hubbell.com/hubbellpowersystems/en/Products/Power-Utilities/Tools-Dies:Accessories/Load-Handling/Gin/Standard-Base-Chain-Gin/p/1648685 [Accessed: Aug. 20, 2021].

The White Rubber Corporation, "White Safety Line, Product Catalog" (2005); [Online Catalog]. Available: http://www.pteus.com/suppliers/catalogs/Safetyline.pdf, [Accessed: Aug. 23, 2021].

Volker Corell (Oct. 9, 2014). DWP Crew Installing new Transformer [Video file]. Available: https://www.youtube.com/watch?v=MaksIIITGk0 [Accessed: Aug. 20, 2021]. (YouTube).

* cited by examiner

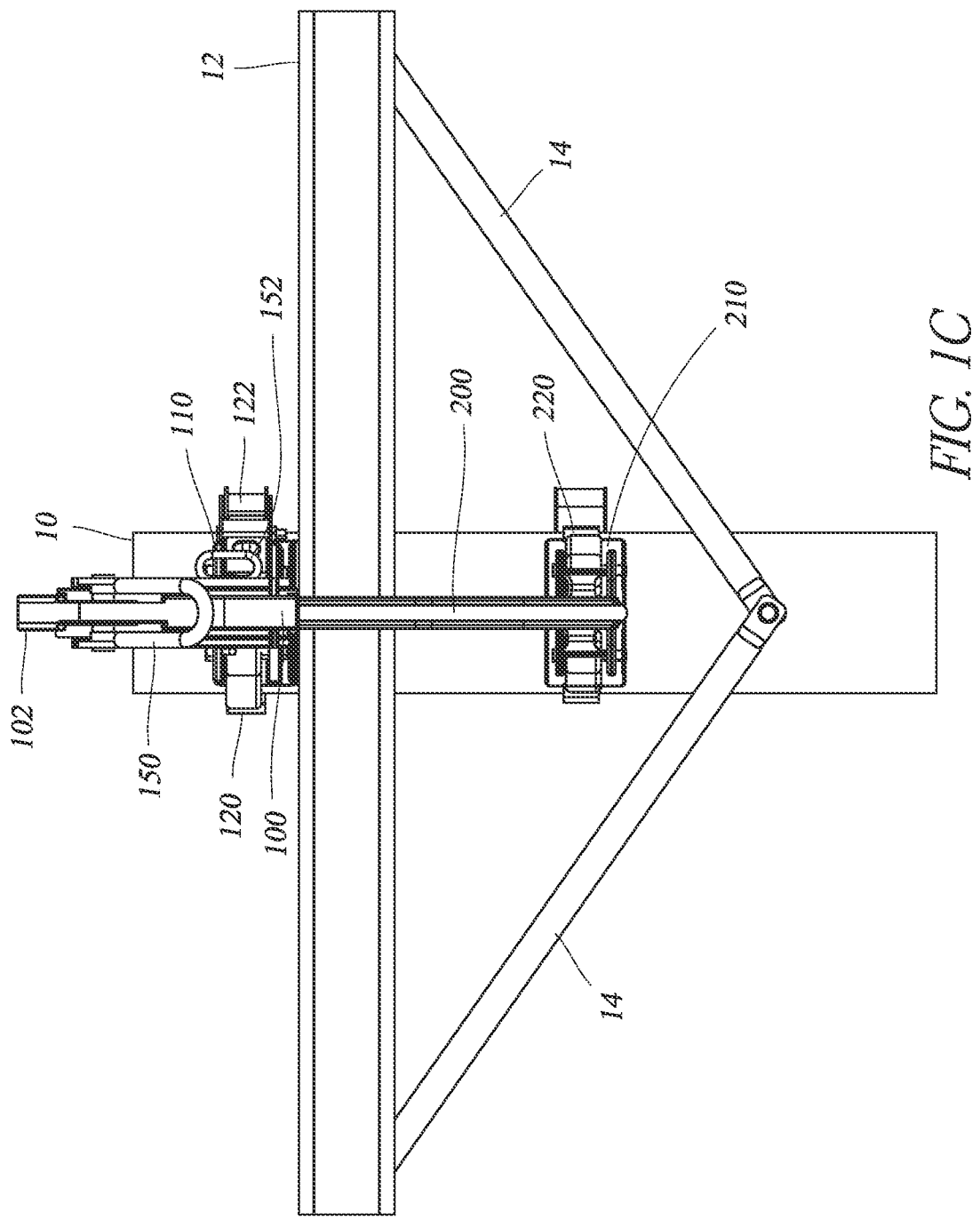

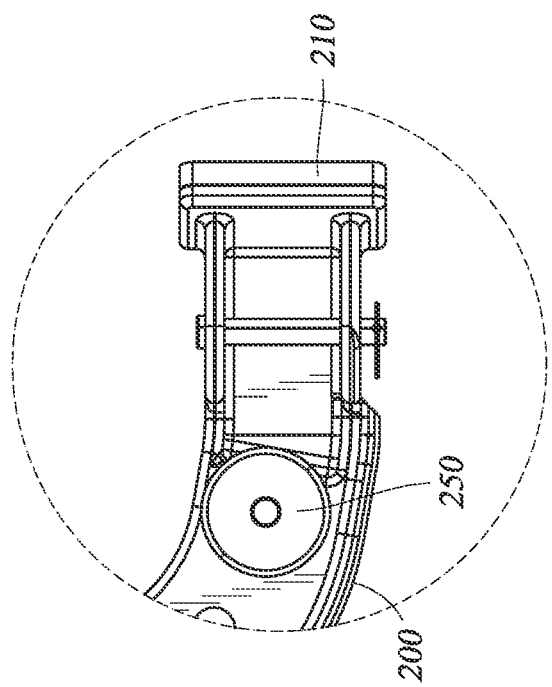
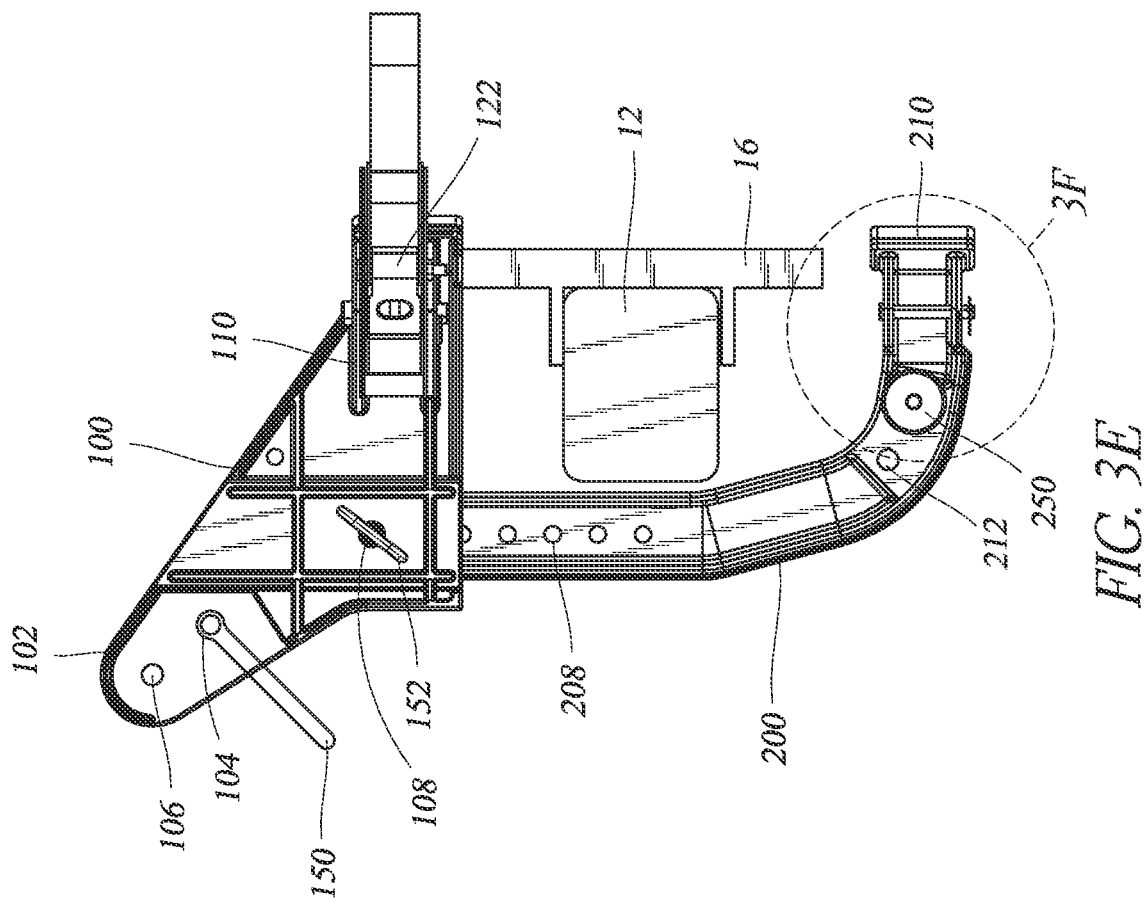
FIG. 3F
FIG. 3E

UTILITY POLE GIN TOOL

INCORPORATION BY REFERENCE TO ANY PRIORITY APPLICATIONS

This application claims the benefit of U.S. Provisional Application No. 63/044,145, filed Jun. 25, 2020, which is hereby incorporated by reference in its entirety.

Any and all applications for which a foreign or domestic priority claim is identified in the Application Data Sheet as filed with the present application are hereby incorporated by reference under 37 CFR 1.57.

BACKGROUND

Gin tools have been used in the utility industry to mount to a utility pole and hoist apparatus, such as transformers, up a utility pole. Current gin tools are typically designed for use on wood or steel utility poles. More recently, utility companies are starting to utilize to composite (fiberglass) poles because of their long term durability, strength and light weight, which makes for easier installation. Therefore, there is a need for a pole gin tool for use on composite poles and preferably wood, steel and composite poles, offer enough clearance to fit over the cross arm sections of the pole and not damage the surface of the composite pole. It should be noted that some of these composite poles come with a fire resistant coating which cannot be damaged.

SUMMARY

The systems, methods and devices of this disclosure each have several innovative aspects, no single one of which is solely responsible for the desirable attributes disclosed herein.

In one aspect, a pole gin includes a first portion having a first strap attachment configured to secure the pole gin to a utility pole at a first location and a second portion having a second strap attachment configured to secure the pole gin to the utility pole at a second location spaced from the first location. The first portion and the second portion can be adjustable relative to one another to vary a distance between the first location and the second location.

In some configurations, the pole gin further includes a pin that secures the first portion and the second portion in a fixed position relative to one another. The first portion can include a channel that receives an elongate portion of the second portion in a sliding manner. The first portion can include a single passage positioned through a width of the first portion at the channel. The second portion can include a series of passages through the width of the second portion at the elongate portion of the second portion, wherein each of the series of passages of the second portion are configured to align with the single passage of the first portion. The pole gin can further include a pin that is configured to pass through the single passage of the first portion and an aligned passage of the series of passages of the second portion to fix the first portion and the second portion relative to one another.

In some aspects, one or more ratchets can be associated with one or both of the first strap attachment and the second strap attachment. The ratchet associated with the second strap attachment can be located on an opposite side of the utility pole from the second portion. The pole gin can further include at least one plate associated with the first strap attachment to protect the utility pole. The pole gin can further include a rubber or similar material layer interposed between the at least one plate and the utility pole. The at least one plate can include a plurality of plates and wherein the rubber layer connects the plurality of plates. The rubber layer can form a living hinge between the plurality of plates. The at least one plate can include a curved surface configured to contact the utility pole.

In some configurations, the first portion can include an extended portion, the extended portion comprising one or more openings configured to receive a shackle. In some embodiments, the shackle is a u-shaped shackle. The shackle can be configured to receive a pulley block to lift a load at an angle. In some aspects, the angle can range from 0 degrees to 45 degrees.

In another aspect, the distance between the first location and the second location ranges from 5 inches to 20 inches. In yet another aspect, the pole gin can further include a rope guide on the second portion.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting on scope.

FIG. 1C illustrates a front view of the gin tool of FIGS. 1A-1B on the utility pole.

FIG. 3E illustrates a side view of the gin tool of FIGS. 3C-3D.

FIG. 3F illustrates a close up view of a rope guide of FIG. 3E.

DETAILED DESCRIPTION

Figure 1A:
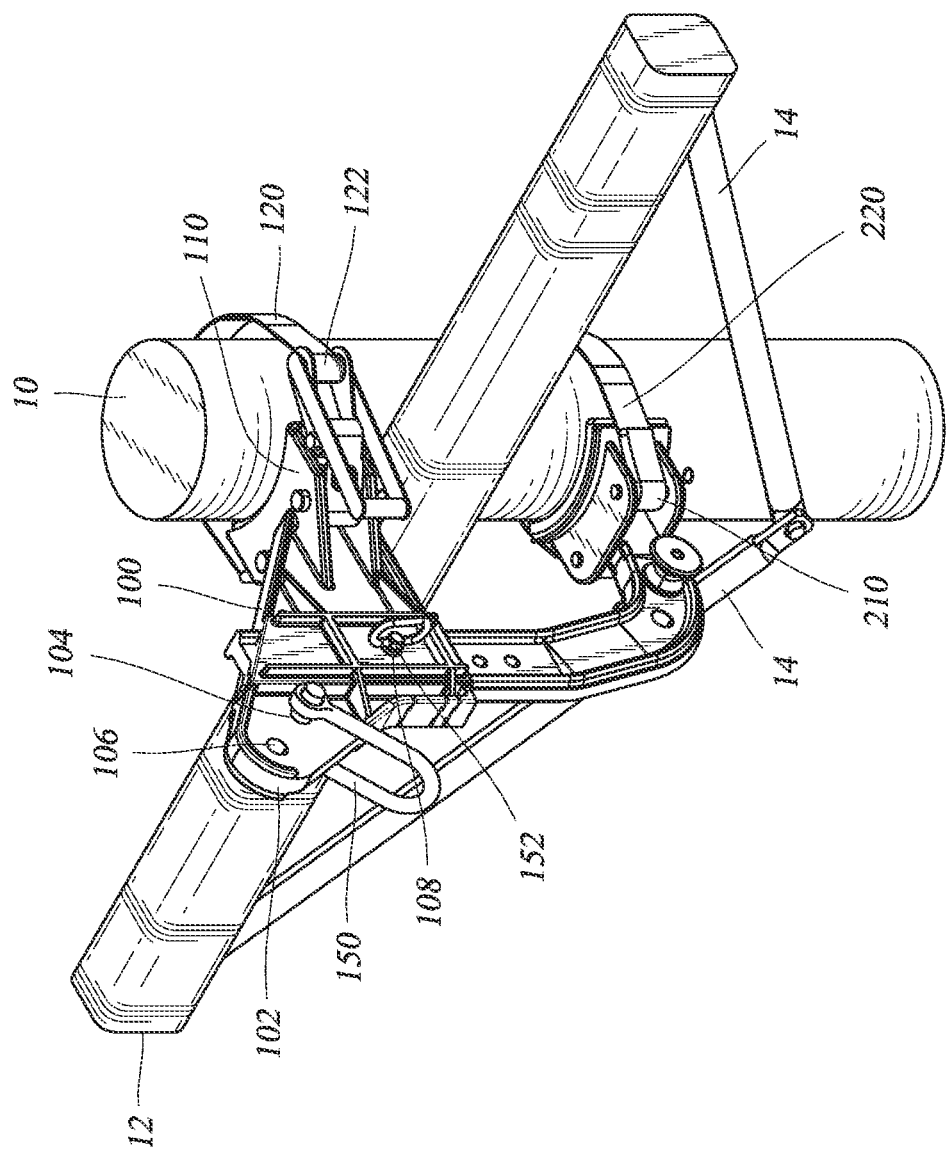
FIG. 1A illustrates a top perspective view of a gin tool on a utility pole.

Embodiments of systems, components and methods of assembly and manufacture are described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import. The dimensions illustrated on the figures are exemplary.

The figures illustrate a pole gin tool assembly (which may also be called a pole gin or a pole gin tool), and portions thereof, configured for connection to a hollow or solid pole (e.g., a utility pole) to allow a worker to mount the pole gin tool assembly and hoist one or more apparatuses (such as transformers) up the pole. The pole gin tool assembly can be configured for use with round or 12-sided, hollow steel, wood, or composite poles, among other possible applications.

As shown in FIGS. 1A-1C and 2A-2B, the composite pole gin tool assembly includes a first portion or a frame 100 and a second portion or an arm 200. As shown, the frame 100 can have a triangular shape when viewed from the side and the arm 200 can have include an elongate body with a straight end and a curved end when viewed from the side. The frame 100 can include an upper or first mount 110 to interface with a pole 10. The arm 200 can include a lower or second mount 210 to interface with a pole 10 at the curved end of the arm 200. The first and second mounts 110, 210 can each include a plate configured to interface with the pole 10 and protect the pole 10 from damage. Each plate of the first and second mounts 110, 120 can have a curved surface, such that each curved surface is shaped to match the curvature of the outside surface of the utility pole 10. The frame 100 and arm 200 can fit together. The frame 100 can include an opening or channel that is shaped and dimensioned to receive a portion of the arm 200, which may be an elongate portion of the arm 200 or a straight end of the elongate body of the arm 200. The upper portion of the arm 200 can be inserted into the opening of the frame 100, such as in a sliding manner. The arm 200 can be moveable relative to the frame 100 to allow for adjustability of the distance or to vary a distance between the upper mount 110 and the lower mount 210. This adjustability can allow the pole gin tool assembly to accommodate for different configurations and components of the utility pole 10.

Figure 1B:
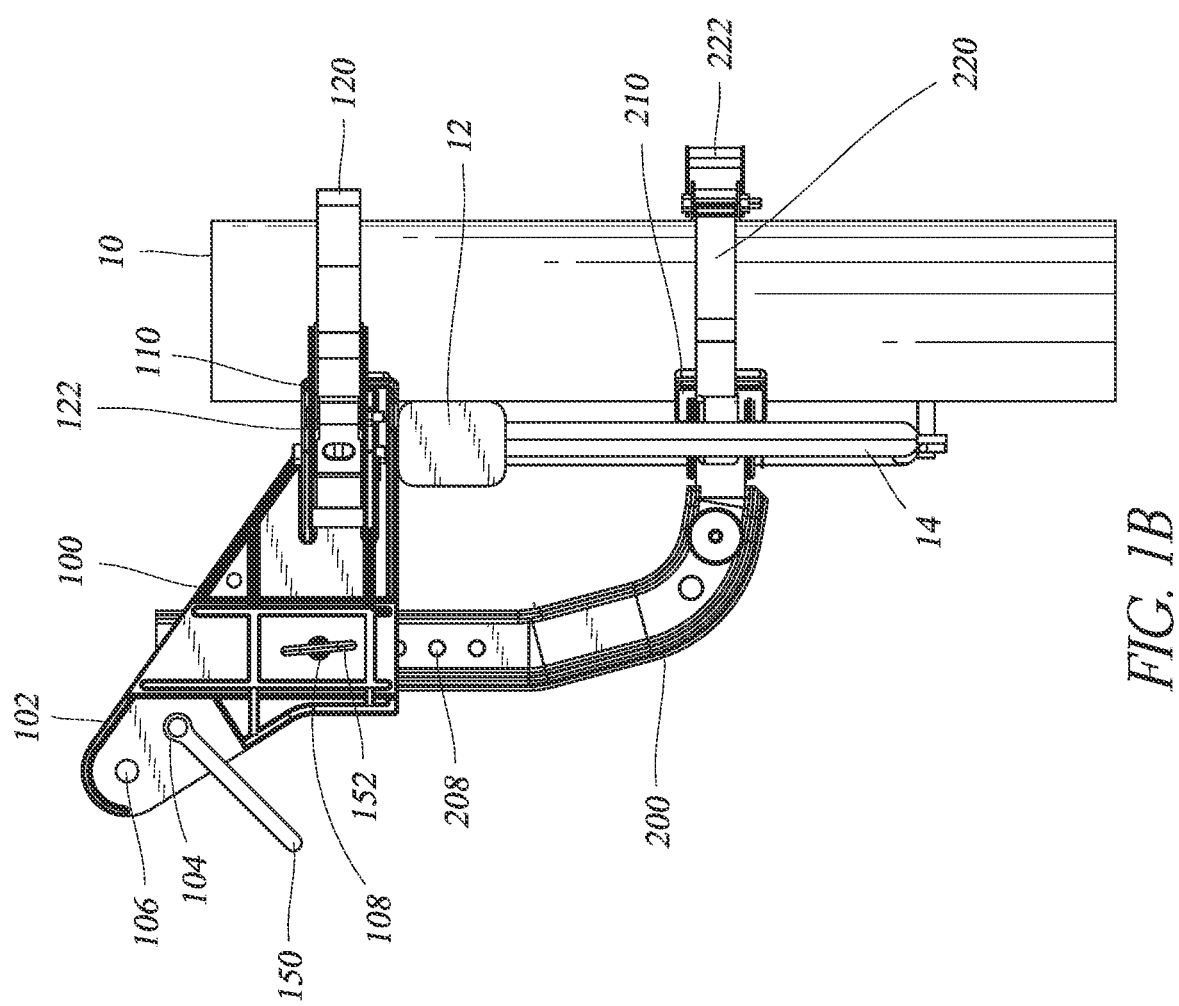
FIG. 1B illustrates a side view of the gin tool of FIG. 1A on the utility pole.
Figure 2A:
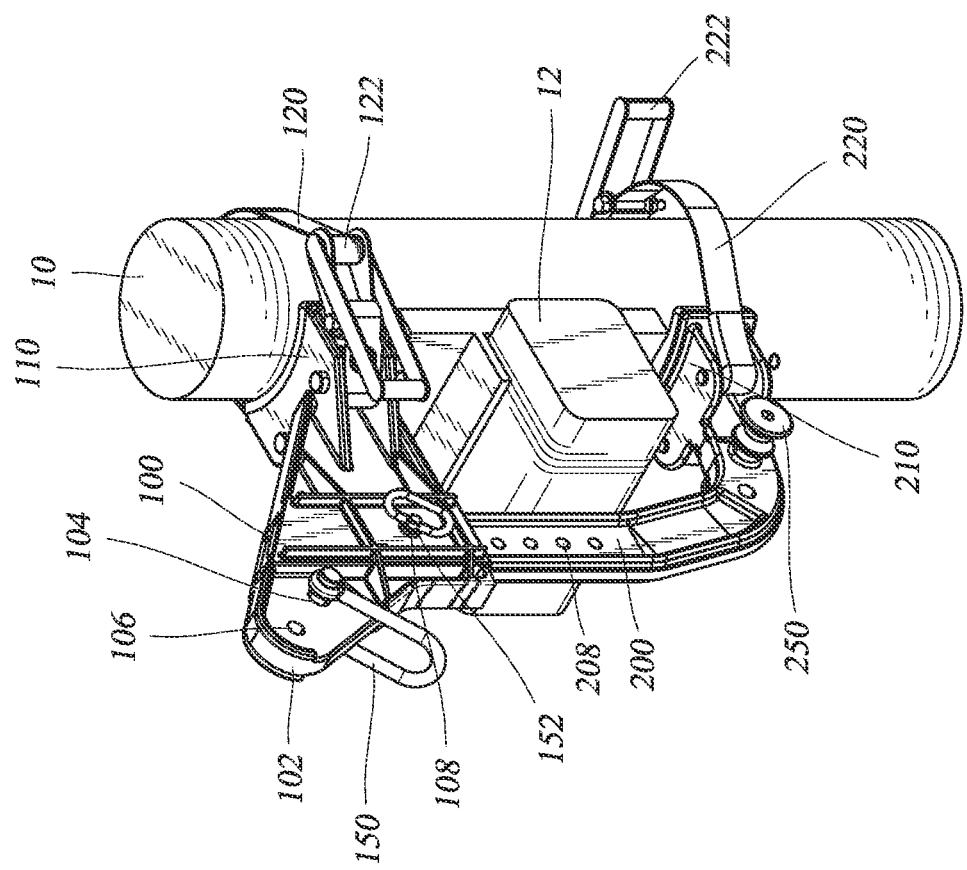
FIG. 2A illustrates a top perspective view of a gin tool on a utility pole.
Figure 2B:
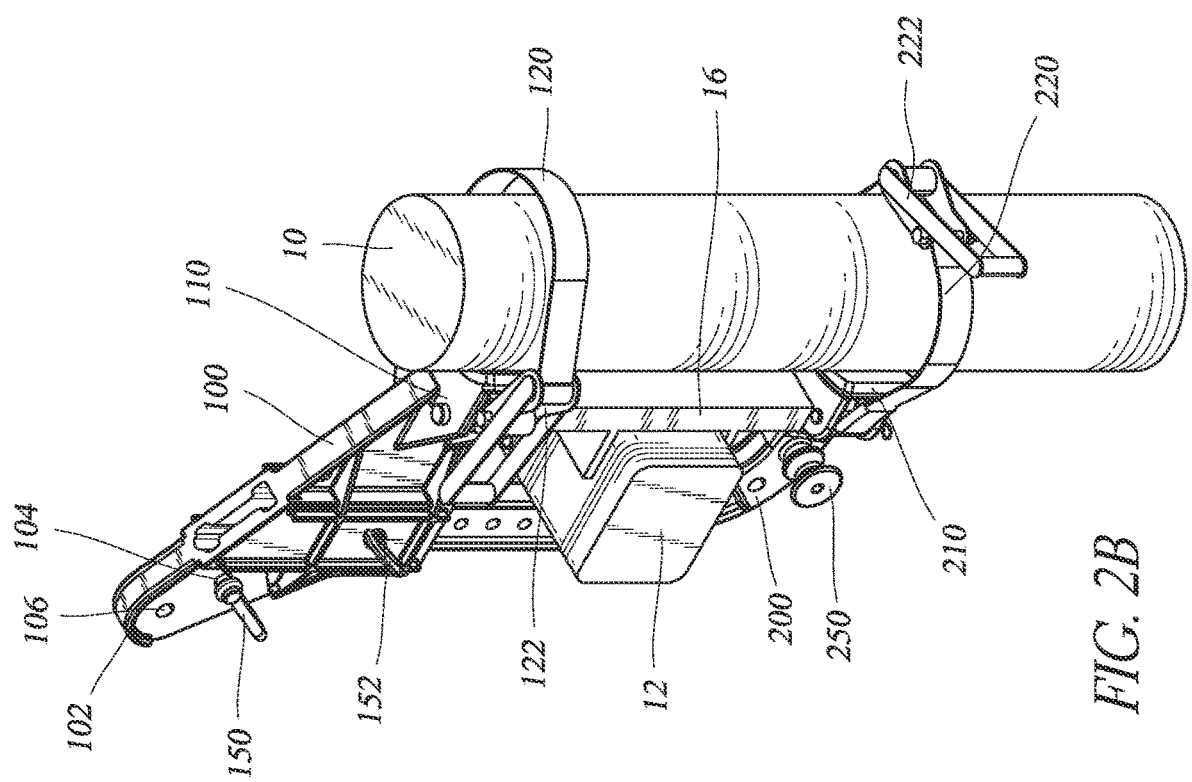
FIG. 2B illustrates a back perspective view of the gin tool of FIG. 2A on the utility pole.

Utility poles can have different components and configurations that a pole gin tool assembly must be able to accommodate. For example, a utility pole 10, such as shown in FIGS. 1A-1C, can have a cross arm 12 and/or V-braces 14. The cross arm 12 can be mounted to the pole 10 with a cross arm bracket 16, such as shown in FIGS. 2A-2C. The gin pole tool assembly can be designed accommodate the cross arm 12, cross arm bracket 16, and/or the V-braces 14.

In some examples, the distance between the upper mount 120 and the lower mount 200 can be between 5 to 20 inches, such as 10 to 15 inches, 15 to 20 inches, or 12 to 14 inches. In some examples, the upper mount 110 can be mounted above the cross arm 12. In some examples, the upper mount 110 can be configured to rest on the cross arm 12, such that the cross arm 12 partially or wholly supports the frame 100.

The arm 200 can be moveable to position the lower mount 210 at the desired location, such as below the cross arm 12 and above the V-braces 14. This advantageously provides the required clearance to fit on various utility poles. For example, the vertical distance between the upper mount 110 and the lower mount 210 can be adjusted to provide clearance for the V-braces 14.

Once the desired distance between the upper mount and lower mount 210 is found, a pin 152 can be inserted to secure the frame 100 and the arm 200 in a fixed position relative to one another. The frame 100 can have a hole or passage 108 positioned along the opening that receives the arm 200. The passage 108 can be configured to be aligned with one of the series of holes or passages 208 of the arm 200, when the arm 200 is inserted into the frame 100. The passage 108 can pass through the width or thickness of the frame 100, such as through the width or thickness along the channel or opening of the frame 100. The series of passages 208 can pass through the width or thickness of the arm 200. When aligned and when the arm 200 is positioned within the frame 100, a pin 152 can pass through the passage 108 of the frame 100 aligned with one of the series of passages 208 of the arm 200, to connect the frame 100 and arm 200. The use of the single pin 152 through a single passage 108 in the frame 100 advantageously allows the arm 200 to pivot and prevents the load from being placed on the pin, the passage 108 in the frame 100, or the passages 208 in the arm 200. Surprisingly, the use of the single pin 152 allows the gin tool to support and hoist an increased load as compared to the use of multiple pins through multiple aligned passages. The use of the single pin 152 through the single passage 108 in the frame 100 to connect to the arm 200, allows the arm 200 to pivot relative to the frame 100 which allows the load to be spread along the entire length of the arm 200. In some examples, the diameter of the passage 108 and series of passages 208 are configured to receive a pin of 5/8 inches. In some examples, the diameter of the passage 108 and series of passages 208 are configured to receive a pin of 3/4 inches.

The particular combination of the single passage 108 of the frame 100 and one of the series of passages 208 of the arm 200 that are aligned can allow the vertical distance between the upper mount 110 and the lower mount 210 to be adjusted. For example, as shown in FIGS. 1A-1C, the arm 200 is positioned within the opening of the frame 100 such that only two of the series of passages 208 are exposed below the frame 100, which provides a clearance of approximately 10.5 inches between the upper mount 110 and the lower mount 210. In comparison, as shown in FIG. 3E, the arm 200 is positioned within the frame 100 such that five of the series of passages 208 are exposed below the frame 100, which provides a clearance of approximately 16 inches.

The upper mount 110 can include a first strap attachment configured to secure the pole gin to a utility pole 10 at a first location. The first strap attachment can include an upper ratchet 122 with an upper strap or loop 120 to secure the upper mount 110 to the utility pole 10. The upper strap 120 can be configured to wrap around the utility pole 10. The upper ratchet 120 can be used to adjust the upper strap 120 to accommodate utility poles of various diameters and to apply a cinching force to secure the frame 100 to the utility pole 10. The lower mount 210 can also include a second strap attachment configured to secure the pole gin at a second location spaced from the first location. The second strap attachment can include a lower ratchet 222 with a lower strap or loop 220 to secure the lower mount 210 to the utility pole 10. The lower strap 220 can be configured to wrap around the utility pole 10. The lower ratchet 220 can be used to adjust the lower strap 220 to accommodate utility poles of various diameters and to apply a cinching force to secure the arm 200 to the utility pole 10.

In some examples, the pole gin tool assembly can include rubber padding or a similar material layer on any or all contact points with the utility pole 10 to protect the utility pole 10, such as the curved surface of the upper mount 110 and lower mount 210. The rubber padding can not only provide a protective surface that prevents damage to the surface of the utility pole 10, but can also increase the friction between the pole gin tool assembly against the utility pole to further secure the pole gin tool assembly.

The upper strap 120 and the lower strap 220 can advantageously secure the pole gin tool assembly to the utility pole 10 without damaging the surface of the utility pole 10. The straps 120, 220 can be large in width to also prevent damage to the surface of the utility pole 10. For example, the straps 120, 220 may be at least 2 inches wide. The straps 120, 220 can provide a larger surface area or a more suitable surface (such as compared to a chain) to interface with the surface of a utility pole 10. For example, the utility pole 10 can be made of fiberglass and/or covered with a protective fire resistant coating. The straps 120, 220 can also be relatively light weight in order to make the pole gin tool assembly lighter (compared to a chain), which can make it easier to maneuver and position the pole gin tool assembly.

As shown in FIG. 2A, the upper ratchet 122 can be positioned on the upper mount 110. As shown in FIG. 2B, the lower ratchet 222 can be positioned on the rear side of the utility pole 10, opposite the side of the utility pole 10 that the upper mount 110 and lower mount 210 is positioned on. The placement of the lower ratchet 222 on the rear side of the utility pole 10 can advantageously avoid interference with the cross bar brace 16.

Figure 3B:
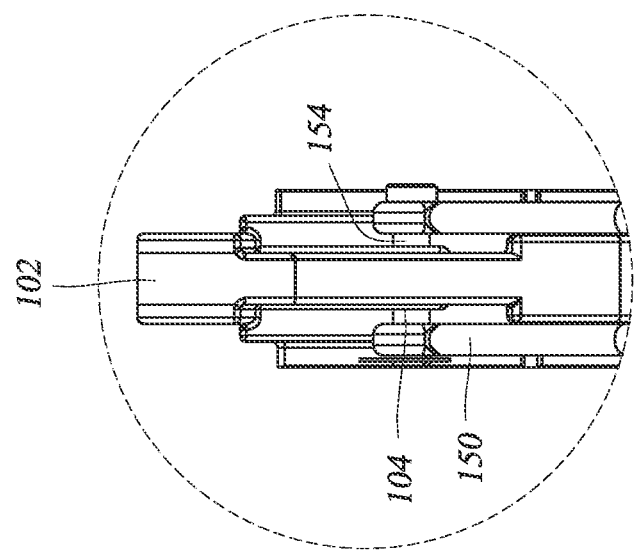
FIG. 3B illustrates a close up view of a snout of the gin tool of FIG. 3A.
Figure 3A:
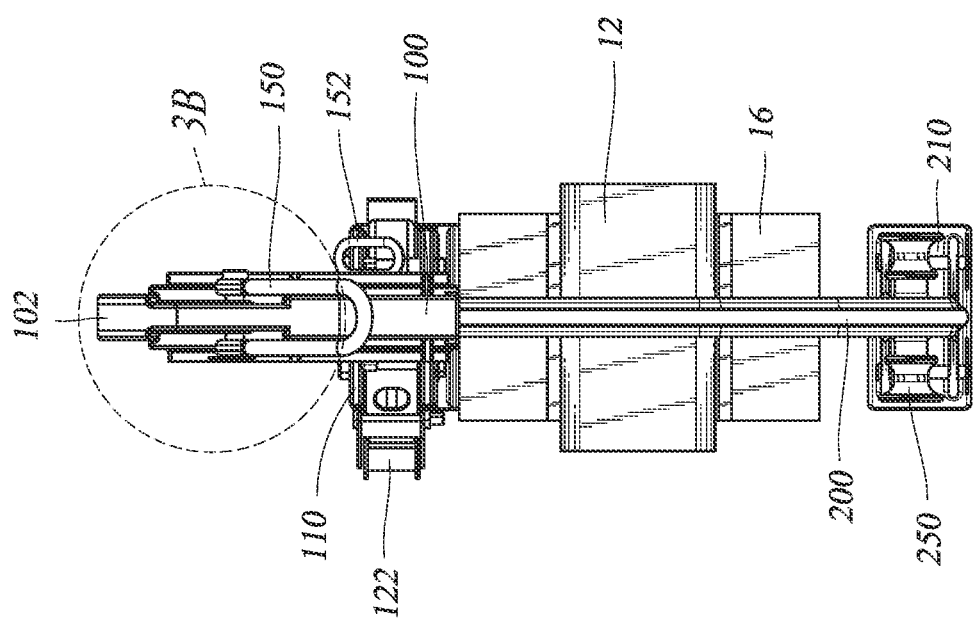
FIG. 3A illustrates a front view of a gin tool with an upper ratchet on a left side.
Figure 3C:
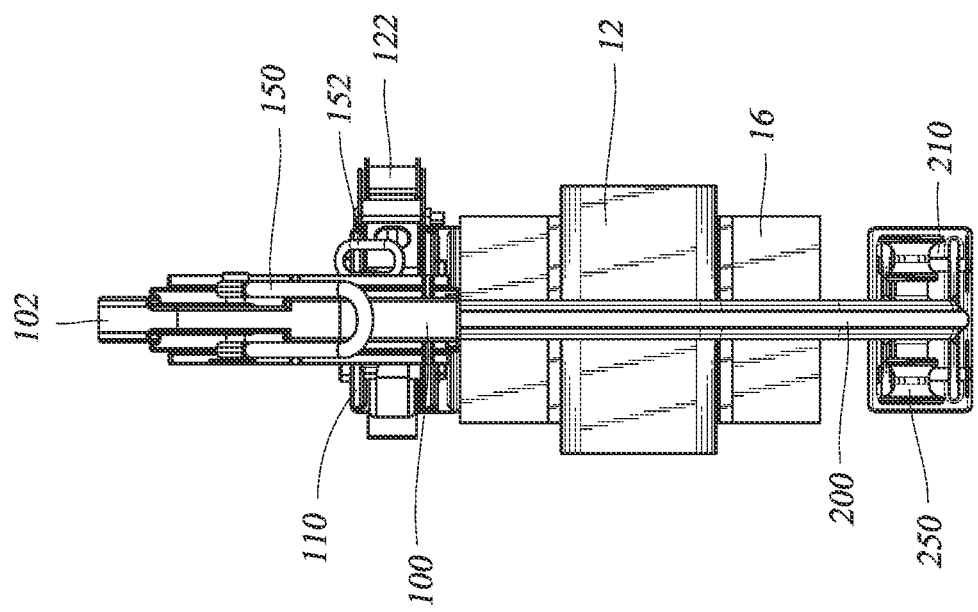
FIG. 3C illustrates a front view of the gin tool with the upper ratchet on the right side.

Furthermore, the upper ratchet 120 can include a quick release pin to allow the upper ratchet 120 to be quickly removed and such that upper ratchet 120 can be on either the left side (such as shown in FIG. 3A) or right side (such as shown in FIG. 3C) of the frame 100. This allows for improved versatility on various pole configurations and for easier installation for the worker.

The frame 100 can have an extension or snout 102 that extends outward and higher than the remainder of the frame 100. The snout 102 includes a first opening 104 and a second opening 106, which can each receive a shackle 150. The first opening 104 and the second opening 106 can have different shapes and/or diameters to receive different types of attachments for a shackle 150, such as a snap hook attachment or a bolted shackle attachment. This allows for improved versatility for different types of attachments. For example, as shown in FIGS. 3A-3B, the u-shaped shackle 150 can be connected to the snout 102 with a shackle pin 154. The shackle pin 154 can pass through the first opening 104 and support the u-shaped shackle 150. The shackle 150 can be then used to attach a pulley block to lift apparatuses (such as a transformer) up the utility pole 10. The snout 102 can be angled, such as at approximately 30 degrees as shown, to provide clearance underneath the snout 102 and to allow lifting a load higher on the utility pole 10. In some embodiments, the snout 102 can be angled at 20 degrees, 25 degrees, 35 degrees, 40 degrees, or 45 degrees.

The structure of the pole gin tool assembly advantageously allows a wider range of angles which the pole gin tool can hoist or lift a load. The pole gin tool assembly is configured to hoist loads in a directly vertical manner from underneath the snout 102. The pole gin tool assembly additionally advantageously allows the load to be tagged out or hoisted at an angle, rather than limited to a direct vertical load. The various angles of hoisting advantageously allow loads to be hoisted even if the area directly below the extension or snout 102 is not clear, such as if there is fencing or rocks or other objects in the way. In some configurations, the load can be hoisted at an angle of up to 45 degrees, such as 10 degrees, 15 degrees, 20 degrees, 25 degrees, 30 degrees, 35 degrees, 40 degrees, or 45 degrees. In some configurations, the load can be lifted from the ground up to 10 to 15 feet away from the base of the pole 10.

The structure of the pole gin tool assembly allows the pole gin tool assembly this useful feature of tagging out or hoisting at various angles. For example, the use of double loops or straps (the upper strap 120 and the lower strap 220) to connect and secure the pole gin tool assembly at two separated points along the pole 10 allows the pole gin tool assembly to stay in position securely against the pole 10 while the load is being hoisted at various angles. The use of loops advantageously prevents twisting or lifting of the pole gin tool assembly when hoisting a load at various angles. Furthermore, the structure of the strap attachments, such as the widths of the loops 120, 220 and the use of the ratchets 120, 220 to cinch secures the pole gin tool assembly to the pole 10. Additionally, the upper ratchet 122 and lower ratchet 222 to tighten each loop 120, 220 are configured to hold the respective mounts 110, 210 flush against the outer surface of the pole 10. The ratchets 122, 222 also effectively distribute the loads along the loops 120, 220. Additionally, the structure of the upper mount 110 and lower mount 210 work to securely hug or wrap around the pole 10 to interface with the outer surface of the pole 10. For example, the curved surface or end of the mounts 110, 120 contacting the pole 10 are each configured to have a width or circumferential length and curvature to maximize the surface area contacting the pole 10. Further, the curved surface of the mounts 110, 120 can be covered with a rubber padding or other suitable material which can not only protect the outer surface of the pole 10 but also further secure the mounts 110, 120 to the pole 10. The structure of the loops 120, 220 and mounts 110, 210 work together to keep the pole gin tool assembly contacting and flushed to the pole 10. These structures are configured to allow minimal deflection of the pole gin tool assembly when hoisting loads at an angle.

Figure 3D:
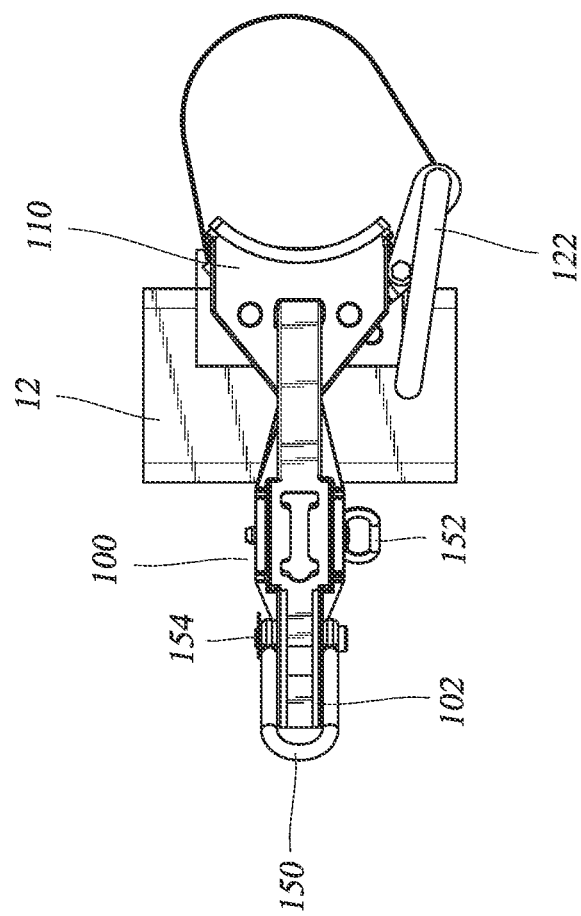
FIG. 3D illustrates a top view of the gin tool of FIGS. 3C.

As shown in FIG. 3D, the upper mount 110 can include rubber padding that interfaces between or is interposed between the curved surface of the upper mount 110 and the outer surface of the utility pole 10 to prevent damage to the utility pole 10. Similarly, the lower mount 210 can include rubber padding that interfaces between or is interposed between the curved surface of the lower mount and the outer surface of the utility pole 10 to prevent damage to the utility pole 10.

In some examples, the upper mount 110 can include wings on either side of the upper mount 110 that can extend around the utility pole 10. The wings can be extension plates, which can be hinged such that they are configured to fold in towards each other or away from each other to accommodate utility poles of various diameters. In this manner, with extension plates, the upper mount 110 can be considered a plurality of plates including the first plate and each of the extension plates on either side of the first plate. In some examples, the wings can be made of the same material as the upper mount 110, such as metal (such as cast aluminum or steel). In some examples, the rubber padding of the upper mount can extend to cover the hinged extension plates to protect the outer surface of the utility pole 10. The rubber padding extending to the extension plates can act as a hinge or living hinge that connects the extension plates to the upper mount 110, as the rubber padding allows the extension plates to fold towards in towards each other or back away from one another to contact the utility pole 10. In some examples, the wings can be made of the rubber padding itself, without a metal plate.

The ratchet 122 can be configured to be positioned against the pole 10. In some examples, the ratchet 122 can be positioned against a wing (if present), on the surface opposite of the rubber padding of the hinged extension plate. The wings, which can be metal plates with rubber piece or solely rubber pieces, can be positioned between the ratchet 122 on one side and the utility pole 10 on the other side. This can protect the pole 10 such that the ratchet 122 contacts the wings and not the surface of the utility pole 10 itself. The use of the wings can still operate to "dig in" or "bite" into a surface to secure the upper strap 120, which can in turn secure the frame 100 to the utility pole 10. The upper mount 110 and the wings can be made of metal (such as cast aluminum or steel) and covered on at least one side with a rubber padding (such as a rubber reinforced with one or more nylon plies). The wings can also be made of rubber padding that extend from the rubber padding of the upper mount 110.

Similarly, the lower mount 210 can be made of metal (such as cast aluminum or steel) and can be covered with a rubber padding that interfaces between the surface of the lower mount 210 and the outer surface of the utility pole 10. The lower ratchet 222 can also include a rubber protector to protect the surface of the utility pole 10.

As shown in FIGS. 3E-3F, the arm 200 can include one or more rope guides 250. The arm 200 can include a rope guide 250 on either side of the arm 200 at the curved lower end of the arm 200. The rope guide 250 can be used to guide or direct one or more ropes down the pole when hoisting or lowering loads, such as equipment like transformers. The hole 212 positioned on the lower end of the arm allows mounting of a shackle for pulling wire (such as electrical wire, conductor) through a conduit on the utility pole 10. The position on the lower end of the arm 200 closer to the utility pole 10 can make it easier to pull the wire closer to the axis of the conduit. In contrast, this would be more difficult if done from the top of the snout 102, which is positioned farther away from the axis of the conduit.

The pole gin tool assembly can be constructed from any suitable material, such as a metal material. In some examples, the pole gin tool assembly can be made of aluminum, which can reduce the weight of the pole gin assembly, or steel, which can provide higher work load limits.

The pole gin tool assembly can include rounded surfaces to avoid damage to ropes when being hoisted. For example, the rope guide 250 can have rounded edges.

CONCLUSION

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. A pole gin, comprising:
    a first portion having a first strap attachment configured to secure the pole gin to a utility pole at a first location;
    a second portion having a second strap attachment configured to secure the pole gin to the utility pole at a second location spaced from the first location,
    wherein the first portion and the second portion are adjustable relative to one another to vary a distance between the first location and the second location,
    wherein the first portion comprises a channel that receives an elongate portion of the second portion in a sliding manner,
    wherein the first portion comprises a single passage positioned through a width of the first portion at the channel,
    wherein the second portion comprises a series of passages through the width of the second portion at the elongate portion of the second portion, wherein each of the series of passages of the second portion are configured to align with the single passage of the first portion,
    a pin that is configured to pass through the single passage of the first portion and an aligned passage of the series of passages of the second portion to fix the first portion and the second portion relative to one another.

2. The pole gin of claim 1, further comprising one or more ratchets associated with one or both of the first strap attachment and the second strap attachment.

3. The pole gin of claim 2, wherein the ratchet associated with the second strap attachment is located on an opposite side of the utility pole from the second portion.

4. The pole gin of claim 2, further comprising at least one plate associated with the first strap attachment to protect the utility pole.

5. The pole gin of claim 4, further comprising a rubber layer interposed between the at least one plate and the utility pole.

6. The pole gin of claim 5, wherein the at least one plate comprises a plurality of plates and wherein the rubber layer connects the plurality of plates.

7. The pole gin of claim 4, wherein the at least one plate comprises a curved surface configured to contact the utility pole.

8. The pole gin of claim 1, wherein the first portion comprises an extended portion, the extended portion comprising one or more openings configured to receive a shackle.

9. The pole gin of claim 8, further comprising the shackle, wherein the shackle is a u-shaped shackle.

10. The pole gin of claim 9, wherein the shackle is configured to receive a pulley block to lift a load at an angle.

11. The pole gin of claim 10, wherein the angle ranges from 0 degrees to 45 degrees.

12. The pole gin of claim 1, wherein the distance between the first location and the second location ranges from 5 inches to 20 inches.

13. The pole gin of claim 1, further comprising a rope guide on the second portion.

14. A pole gin, comprising:
    a first portion having a first strap attachment configured to secure the pole gin to a utility pole at a first location;
    a second portion having a second strap attachment configured to secure the pole gin to the utility pole at a second location spaced from the first location; and
    at least one plate associated with the first strap attachment; and
    a rubber layer interposed between the at least one plate and the utility pole, wherein the first portion and the second portion are adjustable relative to one another to vary a distance between the first location and the second location, wherein the at least one plate comprises a plurality of plates and wherein the rubber layer connects the plurality of plates, wherein the rubber layer forms a living hinge between the plurality of plates.

* * * * *